United States Patent
Wu et al.

(10) Patent No.: US 11,675,099 B2
(45) Date of Patent: Jun. 13, 2023

(54) DE-SPIKING DISTRIBUTED ACOUSTIC SENSOR SEISMIC PROFILE

(71) Applicant: Halliburton Energy Services, Inc., Houston, TX (US)

(72) Inventors: Xiang Wu, Singapore (SG); Mark Elliott Willis, Katy, TX (US); Andreas Ellmauthaler, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 458 days.

(21) Appl. No.: 16/649,802

(22) PCT Filed: May 23, 2019

(86) PCT No.: PCT/US2019/033691
§ 371 (c)(1),
(2) Date: Mar. 23, 2020

(87) PCT Pub. No.: WO2020/236179
PCT Pub. Date: Nov. 26, 2020

(65) Prior Publication Data
US 2021/0405231 A1    Dec. 30, 2021

(51) Int. Cl.
*G01V 1/42* (2006.01)
*G01V 1/22* (2006.01)

(52) U.S. Cl.
CPC ............... *G01V 1/226* (2013.01); *G01V 1/42* (2013.01)

(58) Field of Classification Search
CPC .................................. G01V 1/226; G01V 1/42
See application file for complete search history.

(56) References Cited

U.S. PATENT DOCUMENTS

| 9,719,846 B2* | 8/2017 | Ellmauthaler ......... G01H 9/004 |
| 2016/0245077 A1 | 8/2016 | Willis et al. |

(Continued)

FOREIGN PATENT DOCUMENTS

| WO | WO-2012058626 A1 * | 5/2012 | ............. A61B 18/18 |
| WO | 2016039928 A1 | 3/2016 | |

(Continued)

OTHER PUBLICATIONS

PCT Application No. PCT/US2019/033691, International Search Report, dated Feb. 21, 2020, 3 pages.

(Continued)

*Primary Examiner* — Krystine E Breier
(74) *Attorney, Agent, or Firm* — Delizio, Peacock, Lewin & Guerra (57) ABSTRACT

Embodiments disclosed herein include components, devices, systems, and operations and functions for generating a seismic profile. An optical signal is generated in an optical signal medium disposed in proximity to a formation. A seismic source induces seismic signals within the formation. A backscatter response corresponding to the seismic signals from the optical signal medium is detected and quadrature modulated to generate a quadrature trace. A seismic response is generated by determining phase differences in the backscatter response based on the quadrature modulated backscatter response. Portions of the seismic response above or below a response threshold are removed to generate a threshold seismic response. The threshold seismic response is correlated with at least one of the seismic signals to generate a correlated seismic response.

18 Claims, 6 Drawing Sheets

(56) References Cited

U.S. PATENT DOCUMENTS

| | | | |
|---|---|---|---|
| 2017/0176243 A1 | 6/2017 | Ellmauthaler et al. | |
| 2017/0235006 A1* | 8/2017 | Ellmauthaler | G01V 1/42 |
| | | | 702/6 |
| 2017/0356793 A1 | 12/2017 | Nishiguchi et al. | |
| 2019/0072528 A1* | 3/2019 | Doyle | G01N 29/348 |
| 2020/0018149 A1* | 1/2020 | Luo | E21B 47/12 |

FOREIGN PATENT DOCUMENTS

| | | | | |
|---|---|---|---|---|
| WO | WO-2016159939 A1 * | 10/2016 | | G01V 1/325 |
| WO | 2019018894 A1 | 1/2019 | | |

OTHER PUBLICATIONS

PCT Application No. PCT/US2019/033691, Written Opinion, dated Feb. 21, 2020, 5 pages.

* cited by examiner

DE-SPIKING DISTRIBUTED ACOUSTIC SENSOR SEISMIC PROFILE

TECHNICAL FIELD

The disclosure generally relates to the field of seismic profiling, and more particularly to using and optimizing distributed acoustic sensing for measuring and otherwise determining seismic profiles.

BACKGROUND ART

Vertical seismic profiling (VSP) is a measurement technique used for correlating seismic data gathered below surface (e.g., within an underground borehole) with surface gathered seismic data. There are many different types of VSP with most sharing the characteristic that either the seismic trigger energy source and/or the seismic data detectors are disposed in a borehole. Generally, VSP operation entails using some form of detector such as microphones or geophones that measure vibration type activity induced by energy reflected from a seismic source.

Distributed acoustic sensing (DAS) systems are one type of downhole seismic sensor system utilized for VSP. DAS systems utilize downhole optical fibers as sensing elements to detect acoustic/seismic energy. DAS systems typically utilize Rayleigh backscatter of laser light energy to spatially detect deformation (often referred to as strains) that is distributed along the optical fibers. The backscattered light is processed by a DAS system to determine light phase differences caused by strain and changes in strain along the fiber's core which in turn is translated to measurements of acoustic energy. DAS systems are subject to noise including trace fading caused by transient or permanent material properties variations in the optical fibers that carry input and backscattered optical signals.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody embodiments of the disclosure. However, it is understood that this disclosure may be practiced without these specific details. In other instances, well-known instruction instances, protocols, structures and techniques have not been shown in detail in order not to obfuscate the description.

Overview

Embodiments disclosed herein include hardware and software systems, subsystems, devices, and components for generating seismic profiles utilizing DAS-based VSP. In some embodiments, an optical source including a laser device and a laser signal encoder implement an interrogation function by generating and transmitting a laser optical signal within an optical fiber. The optical fiber is disposed along a length proximate to underground strata comprising one or more formation structure(s). Concurrently with the transmission of the optical signal, a seismic source generates and induces acoustic waves into/within the underground strata. A backscattered response is induced in the optical fiber when the transmitted acoustic energy is deforming (e.g., stretching) the optical fiber. In some embodiments, a modulator is configured to quadrature modulate the backscatter response generated within the optical fiber. The quadrature modulated backscatter response is processed by a phase analyzer to generate a seismic response by determining phase differences in the backscatter response based on the quadrature modulated response. A filter is configured to remove portions of the generated seismic response above and/or below a response threshold that, in some embodiments, is determined based on a signal output strength level of the optical source. In alternate embodiments, the response threshold value(s) is/are determined based on a seismic signal level above and/or below which the seismic response generated by the phase analyzer constitutes a Gaussian distribution. The threshold filtering operation results in a threshold seismic response that, in some embodiments, is correlated with one or more recorded seismic signals generated by the seismic source to generate a correlated seismic response.

Example Illustrations

Figure 1A:
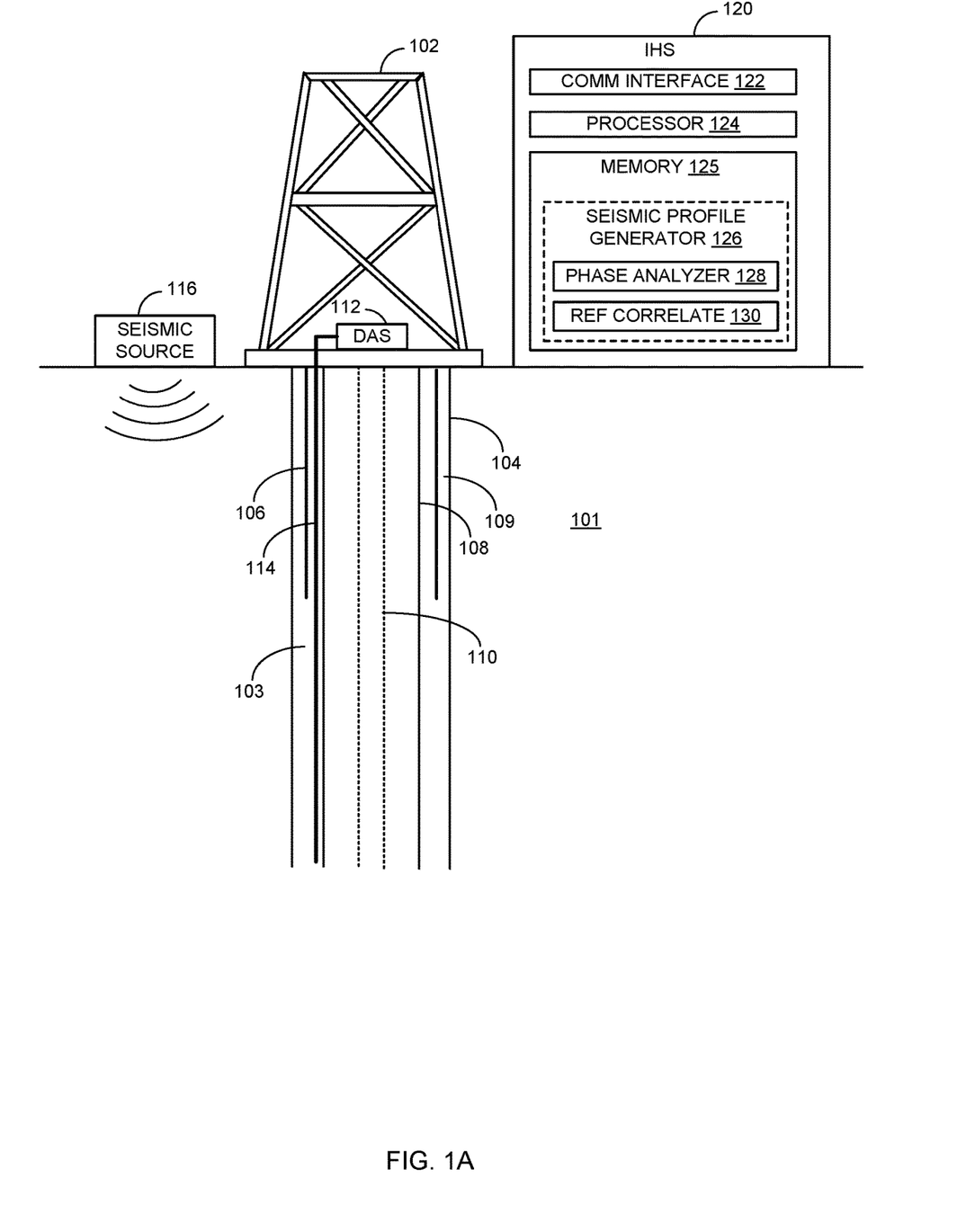
FIG. 1A is a block diagram depicting a system for using distributed acoustic sensing (DAS) to implement vertical seismic profiling (VSP) in accordance with some embodiments.

FIG. 1A is a block diagram depicting a system for implementing vertical seismic profiling (VSP) using a distributed acoustic sensing (DAS) system 112 in accordance with some embodiments. The system comprises, in part, a production rig 102 located at the surface and positioned above a wellbore 103 drilled within a subterranean formation 101. One or more tubular/cylindrical casings are positioned within the wellbore 103 in a concentrically aligned telescopic fashion. As depicted, the casings include a surface casing 106 and a production casing 108. The surface casing 106 is the largest diameter casing and may be fixedly attached to a substantially cylindrical wellbore wall 104 such as via a cement layer 109. Production casing 108 is at least partially positioned within surface casing 106 and may be secured with respect to formation 101 and surface casing 106 via a casing hanger (not shown) and a cement layer. The well portion of the depicted system further includes a production conduit 110 positioned within production casing 108. While the depicted example includes a production rig and corresponding wellbore components, one or more operations and functions disclosed herein may be implemented using a rig and well configured as an injection rig and well.

The system includes DAS system 112, which may be disposed at the surface such as incorporated within an interface module (not expressly illustrated) utilized to control and otherwise operate devices and components such as pumps and valves within production rig 102. DAS system 112 includes an optical fiber cable 114 that is at least partially positioned within the wellbore 103 along a length of and proximate to a section of formation 101. As illustrated, optical fiber cable 114 is positioned between surface casing 106 and production casing 106. Fiber optic cable 114 is configured to protect small optical fibers (not expressly depicted in FIG. 1A) from corrosive wellbore fluids and elevated temperatures and pressures while providing direct mechanical coupling for pressure or strain measurements of seismic signals. Fiber optic cable 114 may include multi-mode and/or single mode optical fibers.

Figure 1B:
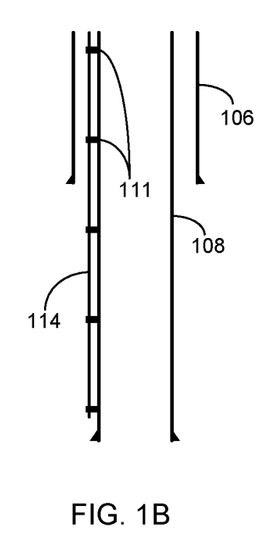
FIGS. 1B-1D depict alternate configurations for deploying a fiber optic cable downhole such as may be implemented in the system shown in FIG. 1A.
Figures 1C, 1D:
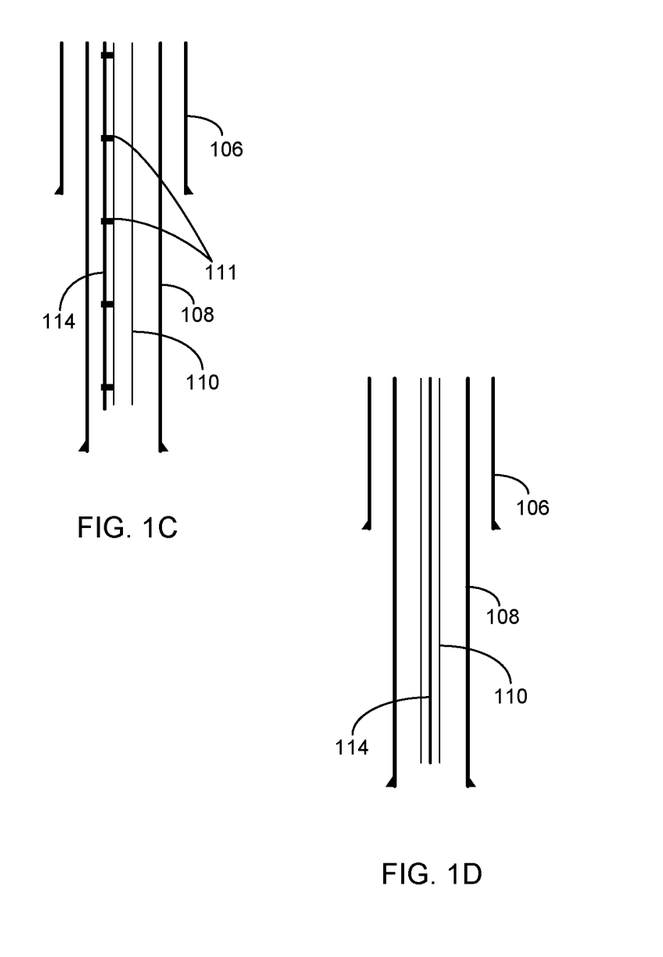

Fiber optic cable 114 may be secured in place between surface casing 106 and production casing 108 such that it functions as a permanently installed seismic sensor. In other embodiments, fiber optic cable 114 may be secured to one or more of the casings such as production conduit 110. In other embodiments, fiber optic cable 114 may be inserted into wellbore 103 in a removable wireline configuration, or positioned at any other suitable position. FIGS. 1B-ID depict alternate configurations for deploying fiber optic cable 114 downhole such as may be implemented in the system shown in FIG. 1A. As illustrated in FIG. 1B, the distributed sensor medium may be permanently or semi-permanently deployed by fastening fiber optic cable 114 to the outside surface of production casing 106 by the use of multiple fasteners 111. In this manner, fiber optic cable 114 remains supported along the length of production casing and may be further secured within a cement layer such as cement layer 109 in FIG. 1A. As depicted in FIG. 1C, the distributed sensor medium may be permanently or semi-permanently deployed by fastening fiber optic cable 114 to the outside surface of production conduit 110, or other piping, within production casing 108. As with the embodiment in FIG. 1B, multiple fasteners 111 may be deployed along the length of production conduit 110 to secure fiber optic cable 114 along a specified path. FIG. 1D illustrates retrievable or otherwise movable deployment of fiber optic cable 114 in a wireline configuration. As shown, fiber optic cable 114 is movably positioned and re-positioned within a tubing member such as production conduit 110. In some embodiments, the wireline configuration may comprise deploying fiber optic cable 114 within a coiled tubing that is deployed within production casing 108.

Although FIG. 1A expressly illustrates a single DAS system 112, multiple DAS systems, each including respective optical fibers disposed in proximity and along a length of formation 101, may be positioned within wellbore 103. With fiber optic cable 114 positioned inside a portion of wellbore 103, DAS system 112 detects, measures, or otherwise obtains seismic data based on mechanical disturbances induced by acoustic energy transmitted or otherwise released by a seismic source 116. Some examples of seismic sources may include unencoded, impulse-inducing sources such as explosives (e.g., dynamite) and air guns. Other types of seismic sources may output periodically repeatable acoustic energy output such as vibroseis trucks. As depicted and described in further detail with reference to FIGS. 2 and 3, seismic data is detected, at least in part, as manifested as strain and changes in strain along fiber optic cable 114. The seismic response data is identified by detecting or otherwise determining phase changes in backscattered light signals, referred to alternately as a backscatter response, along the length of fiber optic cable 114.

The system further includes an information handling system 120 located above ground. Information handling system 120 may be communicably coupled to DAS system 112 through, for instance, a wired or wireless connection. Information handling system 120 may receive measurements in the form of seismic data from DAS system 112 and perform one or more actions described in detail below. Additionally, information handling system 120 may receive seismic data from a data center or storage server in which the seismic data from DAS system 112 may be stored.

Information handling system 120 includes a communications interface 122 for establishing incoming and outgoing communication channels within local systems such as DAS system 112 and remote computer network nodes such as via a Wide Area Network. Information handling system 120 further comprises a processor 124 and a memory 125 for executing various system and application programs. Included among the application programs loaded in memory 125 during vertical seismic profiling (VSP) operations is a seismic profile generator 126. Information handling system 120 receives information via communications interface 122 from DAS system 112, which also includes a communications interface. The data received from DAS system 112 includes backscatter response data such as Rayleigh backscatter data corresponding to the Raleigh backscatter phenomena caused in part by imperfections in fiber optic cable 114 as seismic/acoustic energy causes transient deformation (e.g., stretching) of one or more optical fibers within cable 114.

Figure 2:
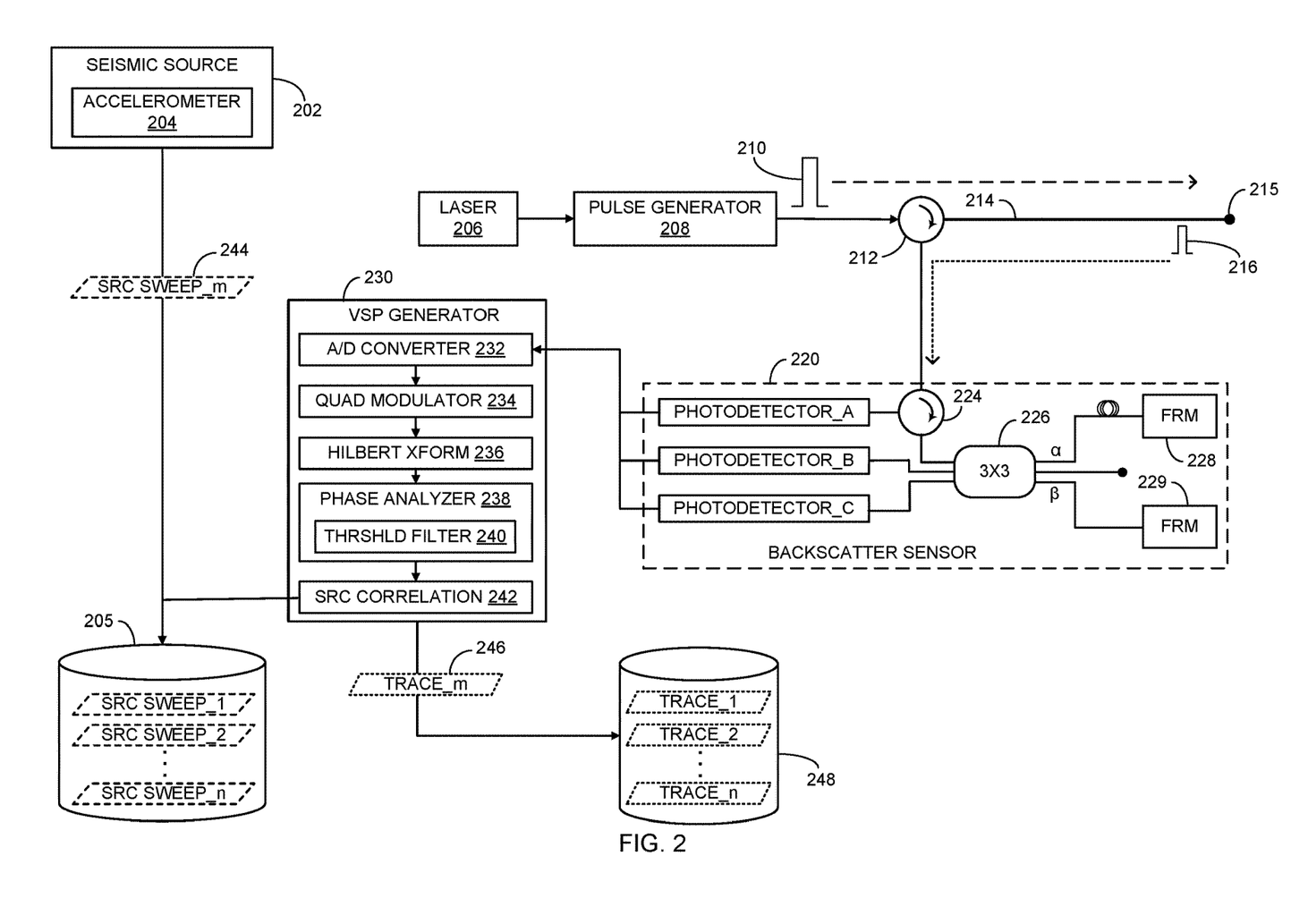
FIG. 2 is a block diagram illustrating subsystems and components within a DAS VSP system for generating and de-spiking DAS data in accordance with some embodiments.

As depicted and described in further detail with reference to FIGS. 2 and 3, seismic profile generator 126 is configured, using any combination of coded software, firmware, and/or hardware, to generate seismic response data and compress the seismic response data to an impulse response. Seismic profile generator 126 includes a seismic response generator 128 that includes any combination of coded instructions configured to generate seismic response data corresponding to the backscatter response data received from DAS system 112. As depicted and described with reference to FIGS. 2 and 3, seismic response generator 128 may include a phase analyzer 128 configured using coded program instructions to detect phase differences in the received backscatter data and generate a seismic response corresponding to the detected phase differences. In some embodiments, such as shown in FIG. 2, seismic response generator 128 includes a quadrature modulation component configured to quadrature amplitude modulate the backscatter response data received from DAS system 112. In such embodiments, the phase analyzer components within seismic response generator 128 are configured to generate a seismic response based on phase differences determined from a quadrature modulated form of the received backscatter data.

DAS systems are generally sensitive to a variety of environmental and survey conditions that can individually and/or collectively degrade signal quality. As depicted as described in further detail with reference to FIGS. 2 and 3, seismic response generator 128 further includes a response post-processing component that removes or otherwise reduces portions of the total backscatter response to minimize degradation of the overall seismic response data while maximally preserving the portions of the response required to ultimately generate an accurate seismic profile. In some embodiments, seismic response generator 128 includes a response threshold filter component comprising any combination of coded program instructions configured to selectively remove trace faded backscatter data from the total backscatter data received from DAS system 112 by applying a threshold to the seismic response generated by the phase analyzer. The threshold filter component may be configured to detect response output signal levels representing time-dependent backscatter responses at each of multiple channels within fiber optic cable 114. The threshold filter removes portions of the total seismic response generated by the phase analyzer component for all channels optical fiber channels that falls above or below one or more response threshold values.

Seismic profile generator 126 further includes a reference correlator program component 130 that is statically or dynamically linked to or otherwise communicatively coupled with seismic response generator 128. Reference correlator 130 is configured, using any combination of coded program instructions, to translate the extended seismic response into an impulse response. The impulse response is generated by cross-correlating the threshold corrected output from seismic response generator 128 with the one or more recorded source signals that were used to induce acoustic energy corresponding to the period of time over which the backscatter response was detected and recorded by DAS.

FIG. 2 is a block diagram illustrating subsystems and components within a DAS VSP system for generating and de-spiking DAS data in accordance with some embodiments. The devices and components depicted and described with reference to FIG. 2 may be implemented in DAS VSP system depicted in FIG. 1A. One or more sub-systems, devices, and components of the depicted system may be integrated with and/or coupled to components of a product or injection well system in a drilling or production/injection phase. The DAS VSP system includes a seismic source 202, which may be a non-encoded, single impulse source such as an explosive device. In the depicted embodiment, seismic source 202 comprises a mechanism for inducing subterranean or underwater vibration. For example, seismic source 202 may comprise an explosive charge comprising gelatin dynamite such as nitroglycerin. For underwater applications or otherwise, seismic source 202 may comprise an air gun having pneumatic chambers with compressed air and discharge at or below the water or ground surface to induce pressure waves. In some embodiments, seismic source 202 may be a stationary or mobile mechanical vibration source such as one or more vibroseis trucks that are sequentially activated at specified surface locations to perform a number of source sweeps. Coupled within or to seismic source 202 is an accelerometer 204 that is configured to measure and record the mechanical motion of whatever seismic energy induction actuator is employed by seismic source 202. For instance, the accelerometer may be mechanically and electronically configured to measure and record the motions of a shaker component (not expressly depicted) of seismic source 202. In this manner, vibration data corresponding to cycles of actuation of seismic source 202 are measured, recorded, and transmitted as source sweep files, such as source sweep file 244, with a source signal database 205.

DAS components of the system include a laser source 206 and pulse generator 208 that generate and transmit encoded optical signals into an optical sensing fiber 214. The DAS components further include a backscatter sensor 220 that is configured to receive and process a backscatter response from sensing fiber 214. The backscatter response is received from sensing fiber 214 via an optical fiber link as shown. The DAS components including laser 206, pulse generator 208 and backscatter sensor 220 may be housed in a container that houses other optical components suitable for performing DAS techniques using optical signals 210 transmitted through sensing fiber 214. In the depicted embodiment, such components include circulators 212 and 224, coupler 226, mirrors 228 and 229, photodetectors A-C all of which are communicably coupled via optical fiber, which like sensing fiber 214, may be any suitable optical fiber for performing DAS functions and operations. The collectively contained DAS components may be located at the surface of the wellbore with sensing fiber 214 coupled to one or more underground components of the drilling system, such as depicted and described with reference to FIG. 1A.

Laser 206 and associated pulse generator 208 are connected to circulator coupler 212 using optical fiber. Laser 206 and pulse generator 208 may be located at any suitable location when performing subterranean sensing operations. In some embodiments, laser 206 and pulse generator 208 are co-located as an integrated unit at the surface of a wellbore. Pulse generator 208 may include opto-electronics configured to generate interrogation pulses 210 by pulse encoding light from laser 206. Optical pulses from the pulse generator 208 may be amplified using optical gain components, such as any suitable amplification mechanisms (not expressly depicted) prior to the interrogation pulses 210 being output to sensing fiber 214. Interrogation pulses 210 may be highly coherent, narrow spectral line width interrogation light signals in some embodiments.

As interrogation pulses 210 travel down sensing fiber 214, imperfections in sensing fiber 214 may cause portions of the light to be backscattered along sensing fiber 214 due to Rayleigh scattering. Light scattered by Rayleigh scattering returns from every point along the length of sensing fiber 214 and is represented as backscattered light 216 in FIG. 2 that may comprise Rayleigh backscatter light. In some embodiments, sensing fiber 214 may be terminated with a low reflection device 215 that may be a tightly bent coiled fiber, an angle cleaved fiber, a coreless optical fiber, an index matching gel or liquid.

Backscattered light 216 may consist of an optical light wave or waves having a phase that is altered by changes to the optical path length at a location or locations along sensing fiber 214 caused by vibration or acoustically induced strain. By determining the phase of the backscattered light signals 216, it is possible to quantify the vibration or acoustics along sensing fiber 214. The phase of the backscattered light 216 may be detected, in part, by the depicted seismic receiver configuration that includes a 3×3 coupler 226. Backscattered light 216 travels through circulator 224 to the input of coupler 226, which splits backscattered light 216 among at least two optical fiber paths such as paths α and β in FIG. 2. Path α includes an additional length L greater than the length of path β, sometimes referred to as gauge length. The split backscattered light 216 may travel down each of paths α and β and be reflected by mirrors 228 and 229. Each of mirrors 228 and 229 may comprise an optical reflection device, such as a Faraday rotator mirror. The reflected light from mirrors 228 and 229 are combined in coupler 226 to form an interferometric signal that is passed to the inputs of photodetectors A-C. The backscattered light signal at each of photodetectors A-C include the combined and interfered light signals from the two paths α and β, with the signals in each path having a relative phase shift from corresponding signals in the other path. Each of photodetectors A-C includes a p-n semiconductor junction configured to covert the input light signals in each of the three paths into electrical current.

The following equations may be utilized to define the light signals a, b, and c received by photodetector_A, photodetector_B, and photodetector_C, respectively:

$$a = k + P_\alpha \cos(2\pi ft) + P_\beta \cos(2\pi ft + \varphi) \qquad \text{a.}$$

$$b = k + P_\alpha \cos(2\pi ft) + P_\beta \cos\left(2\pi ft + \varphi + \frac{2\pi}{3}\right) \qquad \text{b.}$$

$$c = k + P_\alpha \cos(2\pi ft) + P_\beta \cos\left(2\pi ft + \varphi - \frac{2\pi}{3}\right) \qquad \text{c.}$$

where a represents the signal received by photodetector_A, b represents the signal received by photodetector_B, c represents the signal received by photodetector_C, f represents the optical frequency of the light signal, φ represents the optical phase difference between the two light signals from the two arms of the interferometer, $P_\alpha$ and $P_\beta$ represent the optical power of the light signals along paths α and β, respectively, and k represents the optical power of non-interfering light signals received at the photodetectors.

For embodiments in which photodetectors A-C are square law detectors having a bandwidth much lower than the optical signal frequency (e.g., less than 1 GHz), the signals A, B, and C output from the photodetectors A-C, respectively, are computed using the following equations:

$$A = \tfrac{1}{2}(2K^2 + P_\alpha^2 + 2P_\alpha P_\beta \cos(\varphi) + P_\beta^2)$$

$$B = \tfrac{1}{2}(2K^2 + P_\alpha^2 + P_\beta^2 - P_\alpha P_\beta (\cos(\varphi) + \sqrt{3} \sin(\varphi)))$$

$$C = \tfrac{1}{2}(2K^2 + P_\alpha^2 + P_\beta^2 + P_\alpha P_\beta (-\cos(\varphi) + \sqrt{3} \sin(\varphi)))$$

in which A represents the output signal of photodetector_A, B represents the output signal of photodetector_B, and C represents the output signal from photodetector_C. The terms in the above equations that contain φ are the terms that provide relevant information about the optical phase difference since the remaining terms involving the power (k, $P_\alpha$, and $P_\beta$) do not change as the optical phase changes.

The output signals from photodetectors A-C pass to a vertical seismic profile generator 230 for further processing. Profile generator 230 may comprise any combination of processing, memory, and communication software and/or hardware components that may be located at the surface (e.g., at information handling system 120 of FIG. 1A), downhole in an encased information processing system, or distributed there between. In some embodiments, profile generator 230 is configured to measure the interfered signals at photodetectors A-C having three different relative phases shifted by 0°, +120°, and −120°. Profile generator 230 includes components configured to process the 120 out-of-phase signals from the outputs of photodetectors A-C to determine phase differences between the backscattered light signals along paths α and β. The phase differences determined by profile generator 230 are utilized to measure strain on sensing fiber 214 caused by vibrations in proximately located formation. By sampling the signals at photodetectors A-C at a high sample rate, various regions along sensing fiber 214 form channels that may be sampled, with each region having a length of the path mismatch L between paths α and β.

In the depicted embodiment, quadrature processing is performed to determine the phase shift between the two signals that were reflected back over paths α and β. Specifically, profile generator 230 includes an analog-to-digital converter (ADC) 232 that is configured to covert the analog output signals from photodetectors A-C to corresponding digital signal representations. The digitized signal representations are received and processed by a quadrature modulator 234 to generate a quadrature modulated backscatter response from the digitized backscatter data received from ADC 232. In some embodiments, quadrature modulator 234 is a phase-shift keying modulator configured to phase modulate a carrier signal input (not expressly depicted) using the digitized signals from ADC 232.

The output from quadrature modulator 234 is a quadrature signal. A quadrature signal is a two-dimensional signal whose value at each instant in time can be specified by a single complex number having two parts: a real (or in-phase) part and an imaginary (or quadrature) part. Quadrature processing generally refers to the use of the quadrature detected signals generated by quadrature modulator 234 corresponding to the digitized signal outputs from photodetectors A-C. For example, a phase modulated signal y(t) with amplitude A, modulating phase signal θ(t), and constant carrier frequency f may be represented as:

$$y(t) = A \sin(2\pi ft + \theta(t))$$

or $$y(t) = I(t)\sin(2\pi ft) + Q(t)\cos(2\pi ft)$$

where $$I(t) = A \cos(\theta(t))$$

$$Q(t) = A \sin(\theta(t))$$

Quadrature modulator 234 mixes the backscatter signal y(t) from ADC 232 with a carrier signal at a carrier frequency f resulting in a modulated signal at a baseband frequency 2f, wherein the baseband signal may be represented as:

$$y(t)e^{i\theta(t)} = I(t) + i*Q(t).$$

Figure 3A:
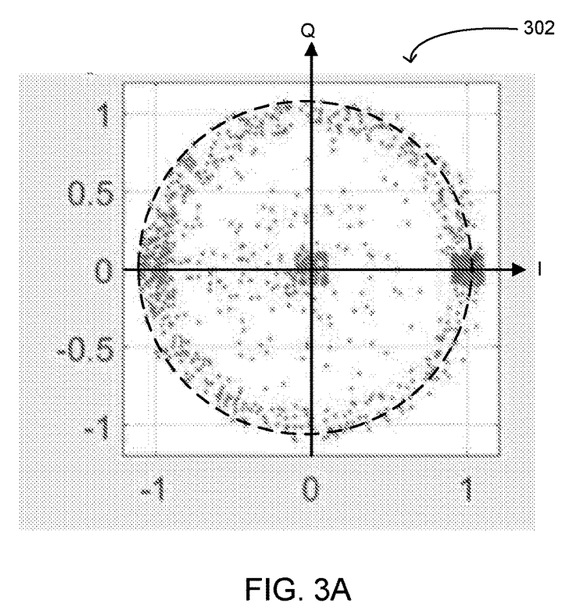
FIG. 3A is a diagram depicting quadrature modulated backscatter information in accordance with some embodiments.

The quadrature modulated signal data may be represented, such as in FIG. 3A, as a quadrature trace 302. As depicted, quadrature trace 302 includes multiple points arranged at various positions with respect to the vertical quadrature axis and horizontal in-phase axis. The points located relatively near the center of quadrature trace 302 represent faded components of the backscatter signals as indicated by the relatively smaller radius, corresponding to signal strength, in comparison to the source optical signal strength represented as the circumferential boundary depicted as having a normalized radius of one.

Because the Q term is shifted by 90° from the I term, a Hilbert transform operation may be performed on I terms to determine corresponding Q terms and also to determine the instantaneous phase at each point on sensing fiber 214. To determine formation information corresponding to seismic attributes indicated by phase differences, profile generator 230 includes a Hilbert transform component 236. Transform component 236 is configured using program instructions to perform a Hilbert transform on the I and Q signal components from quadrature modulator 234.

The reflection strength of induced acoustic energy corresponds to the amplitude of the backscatter signal, y(t), and the instantaneous phase is determined as a function of the ratio of the quadrature and in-phase components. The amplitude and phase of the signal, y, are determined by Hilbert transform component 236 in accordance with the following equations:

$$|y(t)| = \sqrt{I(t)^2 + Q(t)^2}$$

-continued $$\theta(t) = \arctan\left(\frac{Q(t)}{I(t)}\right)$$

The I and Q terms may be expressed in terms of the photodetector output signals A, B, and C, in accordance with the following equations:

$$I = A + B - 2C = \left(\frac{3}{2}\right)P_\alpha P_\beta(\cos(\varphi) - \sqrt{3}\sin(\varphi)) = 3P_\alpha P_\beta \cos\left(\varphi + \frac{\pi}{3}\right)$$

$$Q = \sqrt{3}(A - B) = \left(\frac{3}{2}\right)P_\alpha P_\beta(\cos(\varphi) - \sqrt{3}\sin(\varphi)) = 3P_\alpha P_\beta \cos\left(\varphi + \frac{\pi}{3}\right)$$

wherein the phase shift, which is shifted by π/3, is represented by:

$$\varphi = \arctan\left(\frac{Q}{I}\right) - \frac{\pi}{3}$$

In this manner, the phase of the backscattered light from sensing fiber 214 is determined using the quadrature representations of the DAS data signals received at photodetectors A-C.

The values of the instantaneous phase angle θ(t) are processed by a phase analyzer 238 to extract a seismic response. However, the small-radius values of the quadrature signal representing faded portions of the backscatter response, may introduce a source of substantial error or information gaps during subsequent correlation with the source seismic signal. This is due, at least in part, to the substantial fluctuations in values between consecutive sample points having phase determined as an inverse tangent function of the ratio relation between very small values. Profile generator 230 includes a phase analyzer 238 that includes components for addressing the fluctuation issue to mitigate inaccurate and/or otherwise informationally inadequate seismic profiling results.

The phase information generated by Hilbert component 236 is received and processed by a phase analyzer 238 to recover a seismic response from the backscatter phase information. Phase analyzer 238 is configured, using any combination of program logic, to apply the gauge length to the phase information to recover the seismic/acoustic signal. For example, phase analyzer 238 may be configured to subtract the measured phase from any two locations along sensing fiber 214 and track this phase difference between the two locations over time to obtain the acoustic signal recorded by the fiber between the two selected locations. Phase analyzer 238 generates the recovered time series seismic information such as depicted in FIG. 3B. As shown in FIG. 3B, the recovered time series seismic response data 312 includes a faded portion from approximately six to seven seconds, corresponding to the scattered I-Q diagram components around and near the center origin point of the quadrature scan in FIG. 3A.

Figure 3B:
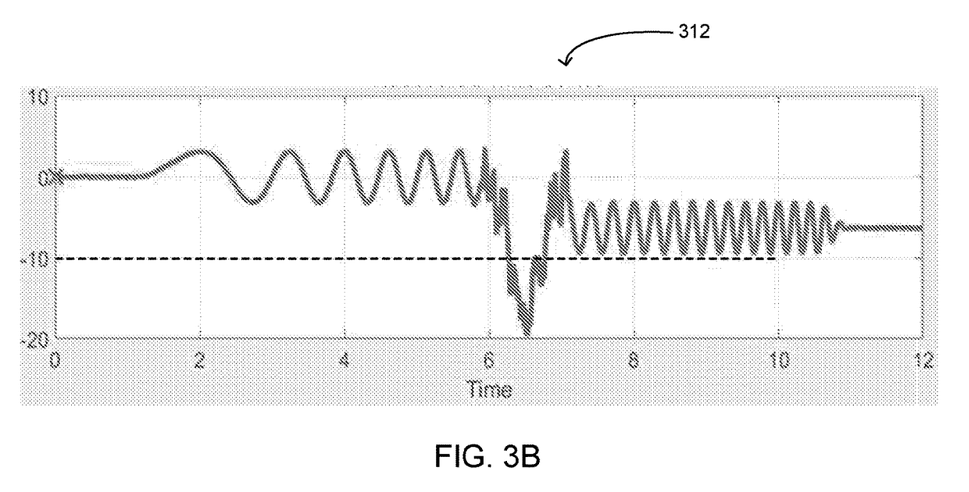
FIG. 3B is a diagram illustrating a time series seismic response representation of the backscatter information in accordance with some embodiments.

With reference to FIG. 2, phase analyzer 238 further includes a threshold filter 240 that is configured, using any combination of program instructions, to remove portions of a seismic response such as the faded portion depicted in FIG. 3B. For example, threshold filter 240 may comprise a program component configured to apply a response threshold value, $T_0$, that may represent a signal strength level such as a level above or below zero in the dependent (vertical) axis for seismic response data 312. The scale may comprise normalized or non-normalized (i.e., single parameter) wave intensity units. In the embodiment shown in FIG. 2 and FIGS. 3A and 3B, $T_0$ is depicted as being set at $T_0 = -10$ units. As described in further detail with reference to FIG. 4, embodiments may include particular techniques for generating and applying one or more threshold values to be applied by threshold filter 240. Threshold filter 240 receives the unfiltered seismic response and removes portion of the response that fall above or below the threshold depending on how the filter is being applied. In the depicted embodiment, threshold filter 240 removes the portions of seismic response 312 that fall below $T_0 = -10$ units.

Profile generator 230 further includes a source correlation unit 242 that receives and processes the filtered output in the form of a threshold seismic response from phase analyzer 238. Source correlation unit 242 is configured, using any combination of program logic, to cross-correlate the threshold seismic response with one or more recorded seismic signals stored within one or more of the source signals files within database 205. As part of the correlation function, source correlation unit 242 is configured to effectively compress the time series threshold seismic response by convolving the extended time series threshold response with a corresponding one or more of the source sweeps. The resultant seismic profile data is recorded in a trace file, such as trace file 246, that is associated with the corresponding source sweep. Trace file 246 may be maintained as a record among other trace file records within a seismic profile database 248.

Figure 4:
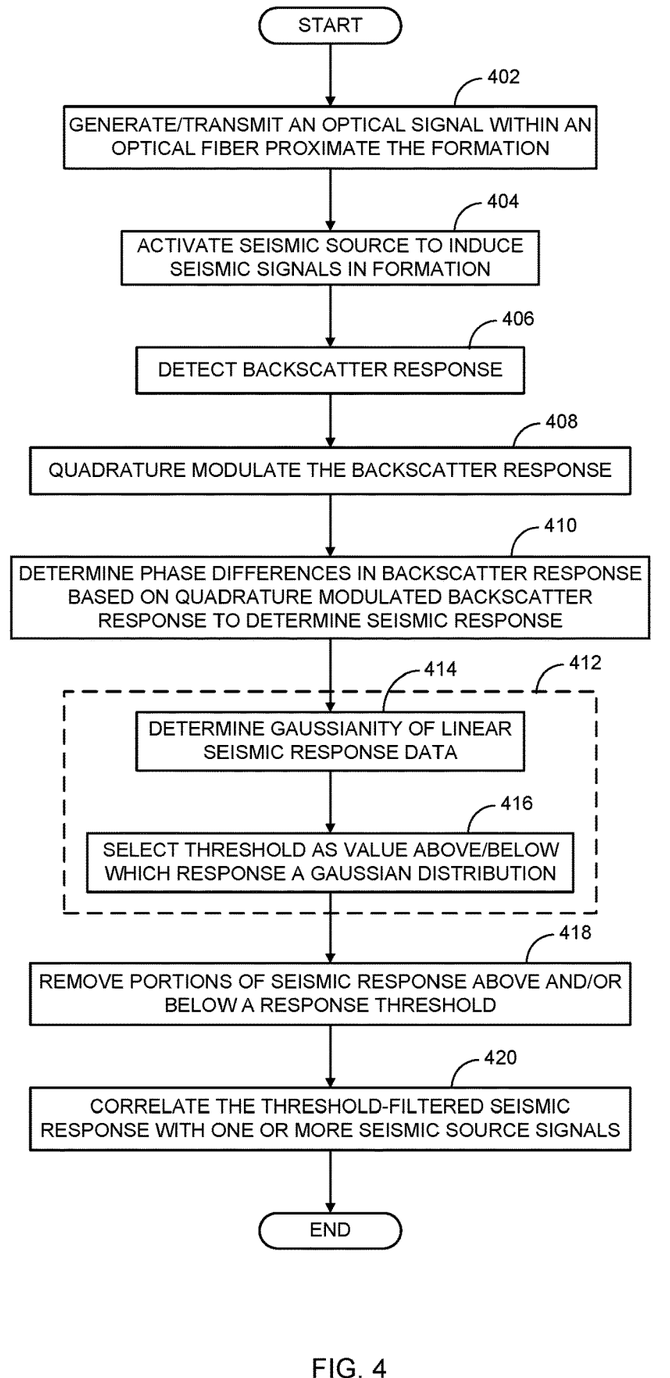
FIG. 4 is a flow diagram depicting operations and functions for implementing vertical seismic profiling using distributed acoustic sensing in accordance with some embodiments.

FIG. 4 is a flow diagram depicting operations and functions for implementing vertical seismic profiling using distributed acoustic sensing in accordance with some embodiments. The operations and functions depicted and described with reference to FIG. 4 may be implemented by any combination of the components, devices, and systems depicted and described with reference to FIGS. 1 and 2. The process begins as shown at block 402 with an optical signal generator, such as a pulse generator receiving optical energy from a laser source generating and emitting an encoded optical signal within a downhole optical fiber element. In some embodiments, the optical fiber element that serves as the sensor fiber comprises one or more individual fibers that are fixedly attached at one or more points along the lengths of the fiber(s) to downhole well structures such as along the exterior or interior of a length of a downhole conduit. The pulse generator may include optoelectronics configured to generate interrogating optical pulses using the raw laser light.

At block 404, a seismic source is activated to induce acoustic energy manifested as seismic signals within a portion of a formation proximate the downhole optical fiber. The seismic source may comprise one or more of a variety of mechanisms for inducing subterranean or underwater mechanical vibration. For example, the seismic source may comprise an explosive charge comprising gelatin dynamite such as nitroglycerin. For underwater applications or otherwise, the seismic source may comprise an air gun having pneumatic chambers with compressed air and discharge at or below the water or ground surface to induce pressure waves. In some embodiments, the seismic source may be a vibroseis source comprising, for example, one or more vibroseis trucks that are sequentially activated at specified surface locations to perform a number of source sweeps. At block 406, a DAS system that includes the seismic signal generator and optical fiber as well as all or some of the DAS components depicted in FIG. 2 detects a backscatter response corresponding to strain and rate of strain on the optical fiber by the induced seismic signals. More specifically, as interrogation optical signals travel down the sensing fiber, imperfections in the sensing fiber cause portions of the light to be backscattered along the sensing fiber due to Rayleigh scattering. The Rayleigh scattered light returns from every point along the sensing fiber along the length of the sensing fiber. As depicted in FIG. 2, the "response" may be determined using an interferometer that generates an interferometric signal that represents the backscatter response.

At block 408, the backscatter response information is received and processed by a quadrature modulator to generate a quadrature trace comprising data points that corresponding to various magnitudes in terms of radial distance from a center point and corresponding to various phase angles within an in-phase and quadrature plane. At block 410, a phase analyzer receives and process the quadrature trace data points to generate a time-series seismic response, such as depicted in FIG. 3B.

At superblock 412, the process continues with selection of a threshold value to be used to remove faded portions of the backscatter response. In some embodiments, a threshold filter, such as filter 240, includes program instructions for processing the Gaussian characteristics of the generated seismic response as shown at block 414. For instance, the filter may be configured to read the entire backscatter response and determine a Gaussian distribution from which non-Gaussian characteristics can be identified. In one embodiment, the Gaussianity of the full response data is determined based on a root-mean-square (RMS)-to-median ratio. In particular, the filter is configured to identify the Gaussian portion of the response as equal to or greater than $\sqrt{2} \cdot \mathrm{erf}^{-1}(0.5)$. For this embodiment, the filter is configured to select the response threshold value to be at or less that the determined Gaussian portion (block 416). In some embodiments, the Gaussianity of the full response is determined based on the shape of probability distributions associated with the response. For instance, a Kurtosis response measurement may be determined. The Gaussian portion of the Kurtosis response may be determined as data points within the response for which the ratio of the fourth order moment and square of the second order moment is three. The non-Gaussian data is accordingly classified as those data points in the response for which the ratio of the fourth order moment and square of the second order moment is greater than three.

At block 418, the threshold filter applied the determined threshold value to remove portions of the seismic response above or below the threshold to generate a threshold seismic response comprising multiple data points falling above or below the threshold. The process concludes at block 420, with a cross-correlator receiving and processing the threshold seismic response with one or more recorded source sweep signals to generate a correlated seismic response.

Example Computer

Figure 5:
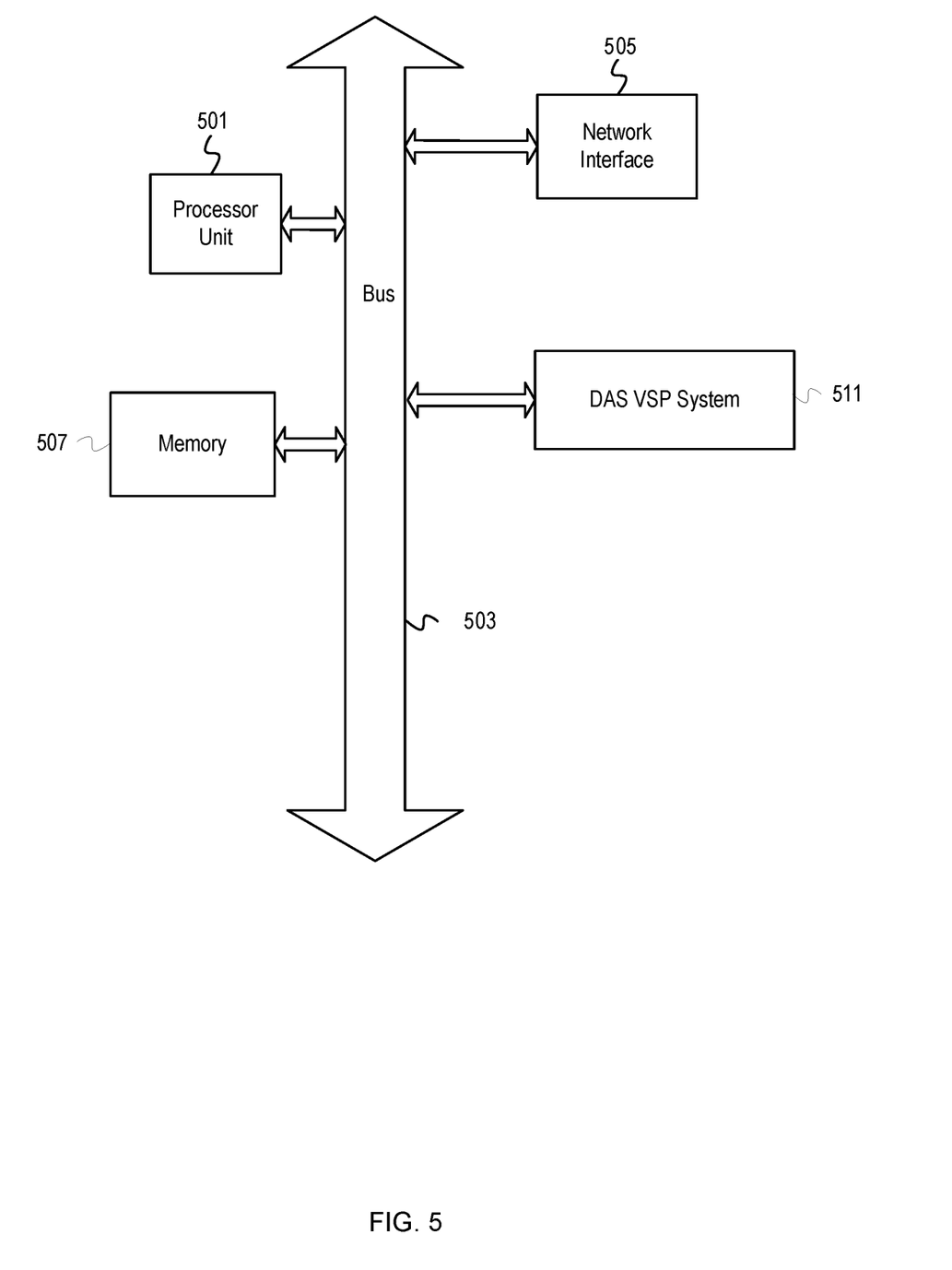
FIG. 5 is a block diagram depicting an example computer system that may be utilized to implement a DAS VSP system in accordance with some embodiments.

FIG. 5 depicts an example computer, according to some embodiments. The computer system includes a processor 501 (possibly including multiple processors, multiple cores, multiple nodes, and/or implementing multi-threading, etc.). The computer system includes a memory 507. The memory 507 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 503 (e.g., PCI, ISA, PCI-Express, HyperTransport® bus, InfiniBand® bus, NuBus, etc.) and a network interface 505 (e.g., a Fiber Channel interface, an Ethernet interface, an internet small computer system interface, SONET interface, wireless interface, etc.).

The system also includes a DAS VSP system 511, which may be hardware, software, firmware, or a combination thereof. For example, the DAS VSP system 511 may comprise instructions executable by the processor 501. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. The DAS VSP system 511 profiles properties of in a formation using optical backscatter signals processed in the manner described above. Additional realizations may include fewer or more components not expressly illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

Variations

While the aspects of the disclosure are described with reference to various implementations and exploitations, it will be understood that these aspects are illustrative and that the scope of the claims is not limited to them. In general, techniques for seismic profiling as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device. Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language; a dynamic programming language; a scripting language; and conventional procedural programming languages. The program code may execute entirely on a stand-alone machine, may execute in a distributed manner across multiple machines, and may execute on one machine while providing results and or accepting input on another machine. The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

EMBODIMENTS

Embodiment 1: A system comprising: an optical source configured to generate an optical signal in an optical medium that is disposed in proximity to a formation; a seismic source configured to induce seismic signals into the formation; a backscatter sensor coupled to the optical medium and configured to detect a backscatter response corresponding to the seismic signals from the optical signal medium; a modulator coupled to the backscatter sensor and configured to quadrature modulate the backscatter response; a phase analyzer configured to generate a seismic response by determining phase differences in the backscatter response based on the quadrature modulated backscatter response; a filter configured to remove portions of the seismic response above or below a response threshold to generate a threshold seismic response; and a cross-correlator configured to correlate the threshold seismic response with at least one of the seismic signals to generate a correlated seismic response.

Embodiment 2: The system of Embodiment 1, wherein said backscatter sensor is configured to receive and measure optical signals within the backscatter response, said backscatter sensor including one or more photodetectors configured to detect amplitude and phase of the optical signals within the backscatter response.

Embodiment 3: The system of Embodiments 1-2, wherein the backscatter sensor includes: a delay line interferometer that generates an interferometric response; and a photodetector assembly including one or more photodetectors configured to receive a phase-shifted version of the interferometric response.

Embodiment 4: The system of Embodiments 1-3, further including a distributed acoustic sensing (DAS) system that incorporates said optical source configured as an interrogator, wherein the filter threshold is determined based, at least in part, on an operating parameter of the interrogator.

Embodiment 5: The system of Embodiments 1-4, wherein said modulator comprises a phase shift keying modulator.

Embodiment 6: The system of Embodiments 1-5, wherein said filter is configured to apply the response threshold having a threshold value that is determined based on a specified multiple of an estimated signal strength of said optical source.

Embodiment 7: The system of Embodiments 1-6, wherein said filter is configured to apply the response threshold having a threshold value that is determined based on a percentage of the seismic response that is above or below the threshold value. For Embodiment 7, the threshold value may be based on a seismic signal level above which or below which the seismic response constitutes a Gaussian distribution. For Embodiment 7, the Gaussian distribution may be determined based on root-means-square to median ratio of data within the seismic response. For Embodiment 7, the Gaussian distribution may be determined based on a ratio of the fourth order moment to a square of the second moment of data within the seismic response.

Embodiment 8: A method for generating a seismic profile, said method comprising: generating an optical signal in an optical signal medium disposed in proximity to a formation; inducing, using a seismic source, seismic signals within the formation; detecting a backscatter response corresponding to the seismic signals from the optical signal medium; quadrature modulating the backscatter response; generating a seismic response by determining phase differences in the backscatter response based on the quadrature modulated backscatter response; removing portions of the seismic response above or below a response threshold to generate a threshold seismic response; correlating the threshold seismic response with at least one of the seismic signals to generate a correlated seismic response.

Embodiment 9: The method of Embodiment 8, wherein said detecting a backscatter response comprises receiving and measuring, by one or more photodetectors, amplitude and phase of optical signals within the optical signal medium.

Embodiment 10: The method of Embodiments 8-9, wherein said detecting a backscatter response comprises: generating, by a delay line interferometer, an interferometric response; and receiving, by a photodetector assembly including one or more photodetectors, a phase-shifted version of the interferometric response.

Embodiment 11: The method of Embodiments 8-10, wherein the optical source is configured as an interrogator, said method further comprising determining the filter threshold based, at least in part, on an operating parameter of the interrogator.

Embodiment 12: The method of Embodiments 8-11, wherein said quadrature modulating the backscatter response comprising quadrature modulating the backscatter response using a phase shift keying modulator.

Embodiment 13: The method of Embodiments 8-12, wherein said removing portions of the seismic response comprises applying the response threshold having a threshold value that is determined based on a specified multiple of an estimated signal strength of said optical source.

Embodiment 14: The method of Embodiments 8-13, wherein said removing portions of the seismic response comprises applying the response threshold having a threshold value that is determined based on a percentage of the seismic response that is above or below the threshold value.

Embodiment 15: The method of Embodiments 8-14, further comprising determining the threshold value based on a seismic signal level above which or below which the seismic response constitutes a Gaussian distribution.

Embodiment 16: The method of Embodiments 8-15, further comprising determining the Gaussian distribution based on root-means-square to median ratio of data within the seismic response.

Embodiment 17: The method of Embodiments 8-16, further comprising determining the Gaussian distribution based on a ratio of the fourth order moment to a square of the second moment of data within the seismic response.

What is claimed is:

1. A system comprising:
    an optical source configured to generate an optical signal in an optical medium that is disposed in proximity to a formation;
    a seismic source configured to induce seismic signals into the formation;
    a backscatter sensor coupled to the optical medium and configured to detect a backscatter response corresponding to the seismic signals from the optical signal medium;
    a modulator coupled to the backscatter sensor and configured to quadrature modulate the backscatter response;
    a phase analyzer configured to generate a seismic response by determining phase differences in the backscatter response based on the quadrature modulated backscatter response;
    a filter configured to remove portions of the seismic response above or below a response threshold to generate a threshold seismic response, wherein the response threshold is based on a seismic signal level above which or below which the seismic response constitutes a Gaussian distribution; and
    a cross-correlator configured to correlate the threshold seismic response with at least one of the seismic signals to generate a correlated seismic response.

2. The system of claim 1, wherein said backscatter sensor is configured to receive and measure optical signals within the backscatter response, said backscatter sensor including one or more photodetectors configured to detect amplitude and phase of the optical signals within the backscatter response.

3. The system of claim 1, wherein the backscatter sensor includes:
    a delay line interferometer that generates an interferometric response; and
    a photodetector assembly including one or more photodetectors configured to receive a phase-shifted version of the interferometric response.

4. The system of claim 1, further including a distributed acoustic sensing (DAS) system that incorporates said optical source configured as an interrogator, wherein the filter threshold is determined based, at least in part, on an operating parameter of the interrogator.

5. The system of claim 1, wherein said modulator comprises a phase shift keying modulator.

6. The system of claim 1, wherein said filter is configured to apply the response threshold having a threshold value that is determined based on a specified multiple of an estimated signal strength of said optical source.

7. The system of claim 1, wherein said filter is configured to apply the response threshold having a threshold value that is determined based on a percentage of the seismic response that is above or below the threshold value.

8. The system of claim 1, wherein the Gaussian distribution is determined based on root-mean-square to median ratio of data within the seismic response.

9. The system of claim 1, wherein the Gaussian distribution is determined based on a ratio of the fourth order moment to a square of the second moment of data within the seismic response.

10. A method for generating a seismic profile, said method comprising:
    generating an optical signal in an optical signal medium disposed in proximity to a formation;
    inducing, using a seismic source, seismic signals within the formation;
    detecting a backscatter response corresponding to the seismic signals from the optical signal medium;
    quadrature modulating the backscatter response;
    generating a seismic response by determining phase differences in the backscatter response based on the quadrature modulated backscatter response;
    removing portions of the seismic response above or below a response threshold to generate a threshold seismic response, wherein the response threshold is based on a seismic signal level above which or below which the seismic response constitutes a Gaussian distribution; and
    correlating the threshold seismic response with at least one of the seismic signals to generate a correlated seismic response.

11. The method of claim 10, wherein said detecting a backscatter response comprises receiving and measuring, by one or more photodetectors, amplitude and phase of optical signals within the optical signal medium.

12. The method of claim 10, wherein said detecting a backscatter response comprises:
    generating, by a delay line interferometer, an interferometric response; and
    receiving, by a photodetector assembly including one or more photodetectors, a phase-shifted version of the interferometric response.

13. The method of claim 10, wherein the optical signal medium is configured as an interrogator, said method further comprising determining the filter threshold based, at least in part, on an operating parameter of the interrogator.

14. The method of claim 10, wherein said quadrature modulating the backscatter response comprising quadrature modulating the backscatter response using a phase shift keying modulator.

15. The method of claim 10, wherein said removing portions of the seismic response comprises applying the response threshold having a threshold value that is determined based on a specified multiple of an estimated signal strength of said optical signal medium.

16. The method of claim 10, wherein said removing portions of the seismic response comprises applying the response threshold having a threshold value that is determined based on a percentage of the seismic response that is above or below the threshold value.

17. The method of claim 10, further comprising determining the Gaussian distribution based on root-mean-square to median ratio of data within the seismic response.

18. The method of claim 10, further comprising determining the Gaussian distribution based on a ratio of the fourth order moment to a square of the second moment of data within the seismic response.

\* \* \* \* \*